US008487015B2

(12) United States Patent
Sasaki et al.

(10) Patent No.: US 8,487,015 B2
(45) Date of Patent: Jul. 16, 2013

(54) FLEXIBLE POLYURETHANE FOAM AND PROCESS FOR ITS PRODUCTION

(75) Inventors: Takayuki Sasaki, Kamisu (JP); Daisuke Kaku, Kamisu (JP); Naohiro Kumagai, Kamisu (JP); Hideo Sakurai, Kamisu (JP); Takashi Ito, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 6 days.

(21) Appl. No.: 12/200,145

(22) Filed: Aug. 28, 2008

(65) Prior Publication Data

US 2009/0062416 A1    Mar. 5, 2009

Related U.S. Application Data

(63) Continuation of application No. PCT/JP2007/053740, filed on Feb. 28, 2007.

(30) Foreign Application Priority Data

Feb. 28, 2006 (JP) .................................. 2006-052011

(51) Int. Cl.
*C08G 18/28* (2006.01)

(52) U.S. Cl.
USPC ............ 521/174; 521/123; 521/124; 521/125

(58) Field of Classification Search
USPC ......................... 521/170, 174, 123, 124, 125
See application file for complete search history.

(56) References Cited

U.S. PATENT DOCUMENTS

| | | | | |
|---|---|---|---|---|
| 5,648,559 | A | * | 7/1997 | Hager ............................ 568/620 |
| 5,874,485 | A | * | 2/1999 | Milliren et al. ................ 521/160 |
| 6,491,846 | B1 | * | 12/2002 | Reese et al. .............. 252/182.27 |
| 6,653,362 | B2 | | 11/2003 | Yoyota et al. |
| 6,734,219 | B2 | | 5/2004 | Wada et al. |
| 6,756,415 | B2 | | 6/2004 | Kimura et al. |
| 7,388,036 | B2 | | 6/2008 | Sasaki et al. |
| 7,388,037 | B2 | | 6/2008 | Sasaki et al. |
| 2004/0152797 | A1 | | 8/2004 | Wada et al. |
| 2004/0229970 | A1 | | 11/2004 | Sasaki et al. |
| 2006/0160913 | A1 | | 7/2006 | Sasaki et al. |
| 2007/0213420 | A1 | | 9/2007 | Kimura et al. |
| 2007/0219284 | A1 | | 9/2007 | Sasaki et al. |
| 2008/0081846 | A1 | | 4/2008 | Sasaki et al. |
| 2008/0081847 | A1 | | 4/2008 | Sasaki et al. |
| 2008/0085945 | A1 | | 4/2008 | Sasaki et al. |
| 2008/0114088 | A1 | | 5/2008 | Sasaki et al. |
| 2008/0176970 | A1 | | 7/2008 | Sasaki et al. |

FOREIGN PATENT DOCUMENTS

| | | |
|---|---|---|
| CN | 1355819 A | 6/2002 |
| EP | 1 712 576 A1 | 10/2006 |
| EP | 1 813 632 A1 | 8/2007 |
| EP | 1 889 861 A1 | 2/2008 |
| EP | 1 911 783 A1 | 4/2008 |
| EP | 2 067 804 A1 | 6/2009 |
| EP | 2 096 129 A1 | 9/2009 |
| JP | 57/76028 | 5/1987 |
| JP | 2004/269850 | 9/1994 |
| JP | 9/157385 | 6/1997 |
| JP | 9/262912 | 10/1997 |
| JP | 10/25327 | 1/1998 |
| JP | 2001/200028 | 7/2001 |
| JP | 2002/3713 | 1/2002 |
| JP | 2002/542353 | 12/2002 |
| JP | 2003/503516 | 1/2003 |
| JP | 2003/522235 | 7/2003 |
| JP | 2003/301041 | 10/2003 |
| JP | 2004/300352 | 10/2004 |
| JP | 2004/530767 | 10/2004 |
| JP | 2005/15521 | 1/2005 |
| JP | 2005/29617 | 2/2005 |
| JP | 2005/301000 | 10/2005 |
| WO | WO 00/04071 A1 | 1/2000 |
| WO | WO 2006/034799 A1 | 4/2006 |
| WO | WO 2006/034800 A1 | 4/2006 |

OTHER PUBLICATIONS

U.S. Appl. No. 12/412,416, filed Mar. 27, 2009, Sasaki, et al.
U.S. Appl. No. 12/429,762, filed Apr. 24, 2009, Sasaki, et al.
U.S. Appl. No. 12/210,509, filed Sep. 15, 2008, Sasaki, et al.
U.S. Appl. No. 12/719,930, filed Mar. 9, 2010, Sasaki, et al.
U.S. Appl. No. 12/732,778, filed Mar. 26, 2010, Sasaki, et al.
Office Action issued Jan. 18, 2011, in Chinese Patent Application No. 200780006759.9, filed Feb. 28, 2007 (with English-language Translation).
U.S. Appl. No. 13/419,556, filed Mar. 14, 2012, Sasaki, et al.
"Datasheet: Soyol R2-052-F Polyol", IDES, XP-002643513, 2011, URL:http://www.ides.com/info/datasheet/E119660/Soyol-R2-052-F-Polyol , 1 page.
"Datasheet: Soyol R3-170-G Polyol", IDES, XP-002643517, 2011, URL:http://www.ides.com/info/datasheet/E119668/Soyol-R3-170-G-Polyol , 1 page.
Supplemental Search Report issued Jul. 29, 2011 in European Patent Application No. 07 73 7494.0-2115/1995263.
U.S. Appl. No. 13/633,402, filed Oct. 2, 2012, Sasaki, et al.

* cited by examiner

*Primary Examiner* — John Cooney
(74) *Attorney, Agent, or Firm* — Oblon, Spivak, McClelland, Maier & Neustadt, L.L.P.

(57) ABSTRACT

A process for producing a flexible polyurethane foam, which comprises reacting a polyol mixture with a polyisocyanate compound in the presence of a urethane-forming catalyst and a blowing agent, characterized in that the polyol mixture comprises the following polyol (A) and the polyol (B), and the proportion of the polyisocyanate compound to the polyol mixture is at least 90 by isocyanate index, and the total amount of Zn and Co contained in the polyol mixture is from 0.1 to 200 ppm.

21 Claims, No Drawings

FLEXIBLE POLYURETHANE FOAM AND PROCESS FOR ITS PRODUCTION

TECHNICAL FIELD

The present invention relates to a flexible polyurethane foam and a process for its production.

BACKGROUND ART

Heretofore, a flexible polyurethane foam has been used for various applications. For example, it is possible to use it widely for from various industrial products to daily use products, such as beddings such as mattresses or cushions, furniture, seat cushions or seat back materials for cars or parts for headrests or armrests. Further, by glueing it to other materials such as cloths or leathers, it is widely used as epidermis materials of cushioning car seats, ceiling materials, top layer materials of sofas as furniture or top layer materials of beds.

However, a flexible polyurethane foam is flammable, and it has been desired to make it flame-retardant. The degree of flame retardancy varies depending on the particular application of the flexible polyurethane foam, and it is required to pass a relatively difficult flammability test, such as Flammability Test of Interior Decorating Materials for Cars (FMVSS-302), Flammability Test of Materials for Electricity, U.S.A. (UL94), Flammability Test of Materials for Railroad Axles (Standards of Department of Transportation, Standard A-A) or Flammability Test for Space Fillers for Seat Cushions of Air Planes (FAR25853(c)). In recent years, a flexible polyurethane foam has been used as a component of an office automation equipment or a component for an electrical apparatus, and a low flammability is required depending on such an application. For example, the Flammability Test of Materials for Electricity, U.S.A. (UL94) has commonly been used as an index for flammability in order to use the foam as a component for an electrical apparatus. According to the specification, it is required to reduce dripping of the flexible polyurethane foam during combustion, as far as possible, and in order to pass the specification, it is necessary to overcome the problem of easiness of carbonization of the flexible polyurethane foam.

Heretofore, the method for making a flexible polyurethane foam flame-retardant may, for example, be a method to foam raw material for the flexible polyurethane foam, which contains a flame retardant. The flame retardant may, for example, be an organic flame retardant such as a halogen-containing compound, a phosphate ester compound or a halogen-containing phosphate ester compound. For example, as an organic flame retardant, such as a phosphate ester compound or a halogen-containing phosphate ester compound, TCEP (tris(chloroethyl) phosphate), TCPP (tris(chloropropyl) phosphate) or TCP (tricresyl phosphate) is an adding-type flame retardant having no active hydrogen which reacts with an isocyanate group. Accordingly, it does not affect the foaming reaction, and it is easy to be used, since it is liquid. It also has a high flame-retardant effect, and by increasing its amount to be used, it is possible to expect improvement in flame retardancy. However, if the amount of the flame retardant is increased, there is an adverse affect on moldability of a flexible polyurethane foam (Patent Documents 1 and 2).

Further, it is also possible to consider using an inorganic type flame retardant such as aluminum hydroxide, antimony trioxide, zinc oxide or expandable graphite, as a flame retardant. However, if the inorganic type flame retardant is used, usually, there are many cases wherein the sufficient amount may not be added because of remarkable viscosity increase of the raw material system. Further, expandable graphite has a characteristic such that it rapidly expands when heated, and by using such a characteristic, it is possible to suppress combustion and to prevent further combustion. However, it is an acidic substance, whereby if it is contained in a raw material for a flexible polyurethane foam in a large amount, a basic urethane-forming catalyst is deactivated, thereby leading to deterioration of a reactivity for a urethane-formation, and as a result, there is an adverse affect on foaming property (Patent Document 3).

In order to solve the above problem, the following techniques have been proposed. Namely, a method to obtain a low-flammable flexible polyurethane foam by selecting diphenylmethane diisocyanate (MDI) having an isocyanate index in a specific range, a melamine resin and liquid form phosphorus type compound as flame retardants and a dimethyl polysiloxane/polyoxyalkylene copolymer having a hydroxyl group at a polyether terminal, as a foam stabilizer (Patent Document 4), a method to impart flame retardancy by immersing a plate-form body cut out from a flexible polyurethane slab foam in an emulsion containing an acryl type resin, a polyvinyl chloride and carbon black, as dispersed (Patent Document 5) and a method to obtain a fine cell structure polyurethane elastomer by adding a flame retardant, a crosslinking agent, a foam stabilizer and a foaming component to an isocyanate-terminal prepolymer, followed by mixing, foaming and curing (Patent Document 6).

However, each one of them is a method of improving flame retardancy by using a conventional flame retardant or further modifying the isocyanate, and such a method does not have sufficient productivity because the production cost is thereby high and it has many production steps. Further, it does not satisfy the demands for both flame retardancy and moldability at the same time.

Further, in the application as e.g. a component of an office automation equipment or a component for an electrical apparatus, a foam less susceptible to deterioration by ultraviolet rays and having good weather resistance in addition to the above mentioned flame retardancy, is needed. As the method to improve weather resistance of a flexible polyurethane foam, a method of adding a polyester polyol, is known (Patent Document 7). However, the flame retardancy is not mentioned, or the weather resistance of a foam using a conventional flame retardant, is not mentioned. Further, the demands for both weather resistance and flame retardancy have not been satisfied at the same time.

On the other hand, a method for producing a flexible polyurethane foam using a polyol which is produced by using a double metal cyanide complex catalyst, is known (Patent Documents 8, 9 and 10). However, the influence of the double metal cyanide complex catalyst contained in the polyol used, is not mentioned. Further, the flame retardancy of the obtained flexible polyurethane foam is not mentioned either.

Patent Document 1: JP-A-2005-301000
Patent Document 2: JP-A-2005-15521
Patent Document 3: JP-A-2002-3713
Patent Document 4: JP-A-2001-200028
Patent Document 5: JP-A-9-262912
Patent Document 6: JP-A-2005-29617
Patent Document 7: JP-A-10-25327
Patent Document 8: JP-A-2004-269850
Patent Document 9: JP-A-2003-522235
Patent Document 10: JP-A-2004-530767

DISCLOSURE OF THE INVENTION

Object to be Accomplished by the Invention

The object of the present invention is to provide a flexible polyurethane foam which has excellent durability, weather resistance and flame retardancy without using a flame retardant, and undergoes little change in hardness against a temperature change (because the temperature sensitivity is suppressed) and which has excellent air flow, small shrinkage and has no irregular cell structure; and a process for producing such a flexible polyurethane foam.

Means to Accomplish the Object

The present invention provides the following.
(1) A process for producing a flexible polyurethane foam, which comprises reacting a polyol mixture with a polyisocyanate compound in the presence of a urethane-forming catalyst and a blowing agent, characterized in that the polyol mixture comprises the following polyol (A) and the following polyol (B), and the proportion of the polyisocyanate compound to the polyol mixture is at least 90 by isocyanate index, and the total amount of Zn and Co contained in the polyol mixture is from 0.1 to 200 ppm, wherein:

Polyol (A) is a polyether polyol having an average of from 2 to 3 hydroxyl groups and a hydroxyl value of from 10 to 90 mgKOH/g, obtained by ring-opening addition polymerization of an alkylene oxide to an initiator using a double metal cyanide complex catalyst containing Zn and Co;

Polyol (B) is a polyether polyol having an average of from 2 to 3 hydroxyl groups and a hydroxyl value of from 15 to 250 mgKOH/g, which is a polyether polyol other than the polyether polyol obtained by ring-opening addition polymerization of an alkylene oxide to an initiator by using a double metal cyanide complex catalyst.

(2) A process for producing a flexible polyurethane foam, which comprises reacting a polyol mixture with a polyisocyanate compound in the presence of a urethane-forming catalyst, a blowing agent and a foam stabilizer, characterized in that the polyol mixture comprises the following polyol (A) and the following polyol (B), and the proportion of the polyisocyanate compound to the polyol mixture is at least 90 by isocyanate index, and the total amount of Zn and Co contained in the polyol mixture is from 0.1 to 200 ppm, wherein:

Polyol (A) is a polyether polyol having an average of from 2 to 3 hydroxyl groups and a hydroxyl value of from 10 to 90 mgKOH/g, obtained by ring-opening addition polymerization of an alkylene oxide to an initiator using a double metal cyanide complex catalyst containing Zn and Co;

Polyol (B) is a polyether polyol having an average of from 2 to 3 hydroxyl groups and a hydroxyl value of from 15 to 250 mgKOH/g, which is a polyether polyol other than the polyether polyol obtained by ring-opening addition polymerization of an alkylene oxide to an initiator by using a double metal cyanide complex catalyst.

(3) The process for producing a flexible polyurethane foam according to the above (1) or (2), wherein the polyol (A) is from 5 to 50 mass %, based on the total (100 mass %) of the polyol (A) and the polyol (B).

(4) The process for producing the flexible polyurethane foam according to any one of the above (1) to (3), wherein the polyol (A) is a polyoxypropylene polyol obtained by ring-opening addition polymerization of only propylene oxide to an initiator.

(5) The process for producing a flexible polyurethane foam according to any one of the above (1) to (4), wherein the total amount of Zn and Co contained in the polyol (A) is from 0.1 to 200 ppm.

(6) The process for producing a flexible polyurethane foam according to any one of the above (1) to (5), wherein the polyol mixture further contains at most 30 parts by mass of the following monool (D), per 100 parts by mass in total of the polyol (A) and the polyol (B):

Monool (D) is a polyether monool having a hydroxyl value of from 5 to 200 mgKOH/g.

(7) The process for producing a flexible polyurethane foam according to the above (6), wherein the monool (D) is a polyoxypropylene monool obtained by ring-opening addition polymerization of only propylene oxide to an initiator.

(8) The process for producing a flexible polyurethane foam according to any one of the above (1) to (7), wherein the polyol mixture further contains at most 10 parts by mass of the following polyol (C), per 100 parts by mass in total of the polyol (A) and the polyol (B):

Polyol (C) is a polyol having an average of from 2 to 6 hydroxyl groups and a hydroxyl value of from 251 to 1,830 mgKOH/g.

(9) A flexible polyurethane foam produced by reacting a polyol mixture with a polyisocyanate compound in the presence of a urethane-forming catalyst and a blowing agent, characterized in that the polyol mixture comprises the following polyol (A) and the following polyol (B), the proportion of the polyisocyanate compound to the polyol mixture is at least 90 by isocyanate index, and the total amount of Zn and Co contained in the polyol mixture is from 0.1 to 200 ppm, wherein:

Polyol (A) is a polyether polyol having an average of from 2 to 3 hydroxyl groups and a hydroxyl value of from to 90 mgKOH/g, obtained by ring-opening addition polymerization of an alkylene oxide to an initiator using a double metal cyanide complex catalyst;

Polyol (B) is a polyether polyol having an average of from 2 to 3 hydroxyl groups and a hydroxyl value of from to 250 mgKOH/g, which is a polyether polyol other than the polyether polyol obtained by ring-opening addition polymerization of an alkylene oxide to an initiator by using a double metal cyanide complex catalyst.

(10) A flexible polyurethane foam produced by reacting a polyol mixture with a polyisocyanate compound in the presence of a urethane-forming catalyst, a blowing agent and a foam stabilizer, characterized in that the polyol mixture comprises the following polyol (A) and the following polyol (B), the proportion of the polyisocyanate compound to the polyol mixture is at least 90 by isocyanate index, and the total amount of Zn and Co contained in the polyol mixture is from 0.1 to 200 ppm, wherein:

Polyol (A) is a polyether polyol having an average of from 2 to 3 hydroxyl groups and a hydroxyl value of from 10 to 90 mgKOH/g, obtained by ring-opening addition polymerization of an alkylene oxide to an initiator using a double metal cyanide complex catalyst;

Polyol (B) is a polyether polyol having an average of from 2 to 3 hydroxyl groups and a hydroxyl value of from 15 to 250 mgKOH/g, which is a polyether polyol other than the polyether polyol obtained by ring-opening addition polymerization of an alkylene oxide to an initiator by using a double metal cyanide complex catalyst.

(11) The flexible polyurethane foam according to the above (9) or (10), wherein the polyol mixture further contains at most 30 parts by mass of the following monool (D), per 100 parts by mass in total of the polyol (A) and the polyol (B):

Monool (D) is a polyether monool having a hydroxyl value of from 5 to 200 mgKOH/g.

(12) The flexible polyurethane foam according to any one of the above (9) to (11), wherein the polyol mixture further contains at most 10 parts by mass of the following polyol (C), per 100 parts by mass in total of the polyol (A) and the polyol (B):

Polyol (C) is a polyol having an average of from 2 to 6 hydroxyl groups and a hydroxyl value of from 251 to 1,830 mgKOH/g.

Effect of the Invention

The flexible polyurethane foam of the present invention has excellent durability, weather resistance and flame retardancy without using a flame retardant, and undergoes little change in hardness against a temperature change (because the temperature sensitivity is suppressed), and it has excellent air flow, small shrinkage and no irregular cell structure.

According to the process for producing a flexible polyurethane foam of the present invention, it is possible to constantly produce a flexible polyurethane foam which has excellent durability, weather resistance and flame retardancy without using a flame retardant, and undergoes little change in hardness against a temperature change (temperature sensitivity is suppressed) and which has excellent air flow, small shrinkage and no irregular cell structure.

BEST MODE FOR CARRYING OUT THE INVENTION

Process for Producing Flexible Polyurethane Foam

In the present invention, the process for producing a flexible polyurethane foam, is a process for producing a flexible polyurethane foam by reacting a specific polyol mixture with a polyisocyanate compound, in the presence of a urethane-forming catalyst and a blowing agent, in such a ratio that the isocyanate index will be at least 90.

Further, in the present invention, the process for producing a flexible polyurethane foam, is a process for producing a flexible polyurethane foam by reacting a specific polyol mixture with a polyisocyanate compound, in the presence of a urethane-forming catalyst, a blowing agent and a foam stabilizer, in such a ratio that the isocyanate index will be at least 90.

The total amount of Zn and Co contained in the polyol mixture is from 0.1 to 200 ppm. By containing Zn and Co in the total amount of from 0.1 to 200 ppm in the polyol mixture, the foaming stability during the production will be improved, and it is possible to suppress formation of irregular cell structures and shrinkage of the foam. Further, the flame retardancy of the obtained flexible polyurethane foam will be improved. The total amount of Zn and Co contained in the polyol mixture is preferably from 0.5 to 100 ppm, more preferably from 1 to 50 ppm.

The total amount of Zn and Co contained in the polyol (A) is preferably from 0.1 to 200 ppm, more preferably from 0.5 to 100 ppm, most preferably from 1 to 50 ppm.

The total amount of Zn and Co contained in the polyol mixture is obtained by the following measuring method.
Method for Measuring Total Amount of Zn and Co
20 g of a polyol mixture is weighed in a platinum dish and burned and incinerated by a gas burner, and then, it is further incinerated completely in an electric furnace at 600° C. Incineration residue is dissolved in 2 mL of 6N hydrochloric acid and adjusted to a volume of 100 mL with distilled water. The amounts of Zn and Co contained in the incinerated residue are measured by an atomic absorption photometer. Determination of the amounts of Zn and Co is made based on a calibration curve prepared by using a standard solution of the metals.

The present invention is based on the discovery such that when a polyether polyol polymerized by using a double metal cyanide complex catalyst containing Zn and Co (hereinafter sometimes referred to simply as "double metal cyanide"), is used, without purification, for producing a urethane foam, the flame retardancy will be improved by the function of contained Zn and Co.

The method of letting a polyol mixture contain Zn and Co may, for example, be (i) a method of using polyol (A) which is not treated for purification after polymerization, that is, polyol (A) having a remaining double metal cyanide complex catalyst or (ii) a method wherein to a polyol mixture comprising polyol (A) (purified) and polyol (B), another unpurified polyol prepared by using a double metal cyanide complex catalyst, is added. Further, as long as the total amount of Zn and Co is from 0.1 to 200 ppm in the polyol mixture, the method is not particularly limited.

The double metal cyanide complex catalyst which is used to let the polyol mixture contain Zn and Co may, preferably, be a zinc hexacyanocobaltate-tert-butyl alcohol catalyst or a zinc hexacyanocobaltate-ethylene glycol dimethyl ether complex, since it has high effects to prevent formation of irregular cell structures or shrinkage of the foam of the flexible polyurethane foam thereby obtained.
Polyol (A)
The polyol (A) is a polyether polyol (a polyoxyalkylene polyol) having an average of from 2 to 3 hydroxyl groups and a hydroxyl value of from 10 to 90 mgKOH/g, obtained by ring-opening addition polymerization of an alkylene oxide to an initiator using a double metal cyanide complex catalyst (DMC catalyst) containing Zn and Co. Namely, the polyol (A) is a polyether polyol having a polyoxyalkylene chain obtained by ring-opening addition polymerization of an alkylene oxide by using a double metal cyanide complex catalyst. By the use of the double metal cyanide complex catalyst, a polyol having a narrow molecular weight distribution can be produced. The polyol having a narrow molecular weight distribution has a low viscosity as compared with a polyol having a wide molecular weight distribution in a molecular weight region of the same level (a polyol having the same hydroxyl value) whereby it is excellent in blendability of reactive materials, and the stability of a foam during the production of the flexible polyurethane foam, will be improved.

As the double metal cyanide complex catalyst, one disclosed in JP-B-46-27250 may, for example, be used. As a specific example, a complex containing zinc hexacyanocobaltate as the main component may be mentioned, and its ether and/or alcohol complex is preferred. The ether may, for example, be preferably ethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME). The alcohol may, for example, be preferably tert-butyl alcohol.

The alkylene oxide may, for example, be ethylene oxide, propylene oxide, 1,2-epoxybutane or 2,3-epoxybutane. Among them, propylene oxide, or a combination of propylene oxide and ethylene oxide, is preferred. Particularly preferred is propylene oxide alone. Namely, as the polyol (A), a polyoxypropylene polyol obtained by ring-opening addition polymerization of only propylene oxide to an initiator is preferred. By using only propylene oxide, the durability of a flexible polyurethane foam to be obtained, in a humidified state will be improved.

As the initiator, a compound having 2 or 3 active hydrogen atoms in its molecule may be used alone, or such compounds may be used in combination. Specific examples of the compound having 2 active hydrogen atoms include ethylene glycol, propylene glycol, 1,4-butanediol, diethylene glycol and dipropylene glycol. Further, specific examples of the compound having 3 active hydrogen atoms include glycerol and trimethylolpropane. Further, it is preferred to employ a polyether polyol having a high hydroxyl value obtained by ring-opening addition polymerization of an alkylene oxide, preferably propylene oxide, to such a compound. Specifically, it is preferred to employ a high hydroxyl value polyether polyol (preferably polyoxypropylene polyol) having a molecular weight per hydroxyl group of from about 200 to 500, i.e. a hydroxyl value of from 110 to 280 mgKOH/g.

The polyol (A) has an average of from 2 to 3 hydroxyl groups. The average number of hydroxyl groups means an average in number of active hydrogen atoms in the initiator. By adjusting the average number of hydroxyl groups to 2 to 3, the obtainable flexible polyurethane foam will be excellent in physical properties such as the dry set. Further, the obtainable flexible polyurethane foam will have good elongation and not high hardness, and it will be excellent in physical properties such as the tensile strength. As the polyol (A), it is preferred to employ a polyether diol having 2 hydroxyl groups in an amount of from 50 to 100 mass % based on the polyol (A), from a viewpoint such that the temperature sensitivity of the obtainable flexible polyurethane foam may easily be suppressed, and that the obtainable flexible polyurethane foam shows excellent flame retardancy.

The polyol (A) has a hydroxyl value of from 10 to 90 mgKOH/g. By adjusting the hydroxyl value to be at least 10 mgKOH/g, it is possible to constantly produce the flexible polyurethane foam by suppressing collapse, etc. Further, by adjusting the hydroxyl value to be at most 90 mgKOH/g, the obtainable flexible polyurethane foam will be excellent in flexibility. The hydroxyl value of the polyol (A) is particularly preferably from 10 to 60 mgKOH/g.

The unsaturation value of the polyol (A) is preferably at most 0.05 meq/g, further preferably at most 0.01 meq/g, particularly preferably at most 0.008 meq/g. By adjusting the unsaturation value to be at most 0.05 meq/g, the obtainable flexible polyurethane foam will be excellent in durability.

The lower limit of the unsaturation value is ideally 0 meq/g. The measurement of the unsaturation value is carried out in accordance with JIS K 1557 (1970 Edition).

The polyol (A) may be a polymer-dispersed polyol. The polyol (A) being a polymer-dispersed polyol means is that it constitutes a dispersion system wherein the polyol (A) is a base polyol (dispersing medium), and fine polymer particles (dispersoid) are constantly dispersed.

As the fine polymer particles, an addition polymerization type polymer or a condensation polymerization type polymer may be mentioned. The addition polymerization type polymer may, for example, be obtained by homopolymerizing or copolymerizing a monomer such as acrylonitrile, styrene, a methacrylate or an acrylate. Further, the condensation polymerization type polymer may, for example, be polyester, polyurea, polyurethane or polymethylol melamine. By the presence of fine polymer particles in the polyol, the hydroxyl value of the polyol can be controlled to be low, and it is effective to improve the mechanical properties such that the hardness of the flexible polyurethane foam can be increased. Further, the content of the fine polymer particles in the polymer-dispersed polyol is not particularly limited, but it is preferably from 0 to 5 mass %, based on the entire polyol (A). Here, various physical properties (such as the unsaturation value, the hydroxyl value, etc.) as the polyol of such a polymer-dispersed polyol are considered with respect to the base polyol excluding the fine polymer particles.

Polyol (B)

The polyol (B) is a polyether polyol having an average of from 2 to 3 hydroxyl groups and a hydroxyl value of from 15 to 250 mgKOH/g, which is a polyether polyol other than the polyether polyol obtained by ring-opening addition polymerization of an alkylene oxide to an initiator by using a double metal cyanide complex catalyst. Namely, it is a polyether polyol obtained by ring-opening addition polymerization of an alkylene oxide to an initiator by using an alkylene oxide ring-opening addition polymerization catalyst.

The alkylene oxide ring-opening addition polymerization catalyst is preferably a phosphazenium compound, a Lewis acid compound or an alkali metal compound catalyst. Among them, the alkali metal compound catalyst is particularly preferred. As the alkali metal compound catalyst, potassium hydroxide (KOH) or cesium hydroxide (CsOH) may, for example, be mentioned.

The alkylene oxide may, for example, be ethylene oxide, propylene oxide, 1,2-epoxybutane or 2,3-epoxybutane. Among them, propylene oxide, or a combination of propylene oxide and ethylene oxide, is preferred.

As the polyol (B), it is preferred to employ a polyoxypropylene polyol obtainable by ring-opening addition polymerization of only propylene oxide to an initiator, whereby the durability of the obtainable flexible polyurethane foam in a humidified state will be improved.

Further, as the polyol (B), it is preferred to use a combination of a polyoxypropylene polyol obtainable by ring-opening addition polymerization of only propylene oxide to an initiator and a polyoxypropyleneoxyethylene polyol having an oxyethylene group content of from 50 to 100 mass % in the oxyalkylene groups, obtainable by ring-opening addition polymerization of a mixture of propylene oxide and ethylene oxide, whereby the durability of the obtainable flexible polyurethane foam in a humidified state will further be improved. In a case where such a polyoxypropyleneoxyethylene polyol is to be used, it is preferably used in an amount of from 1 to 20 mass %, more preferably from 2 to 10 mass %, in the polyol (B).

As the initiator, a compound having 2 or 3 active hydrogen atoms in its molecule may be used alone, or such compounds may be used in combination. Specific examples of the compound having 2 or 3 active hydrogen atoms include a polyhydric alcohol such as ethylene glycol, propylene glycol, 1,4-butanediol, diethylene glycol, dipropylene glycol, glycerol or trimethylolpropane; a polyhydric phenol such as bisphenol A; and an amine such as monoethanolamine, diethanolamine, triethanolamine or piperazine. Among them, a polyhydric alcohol is particularly preferred. Further, it is preferred to employ a high hydroxyl value polyether polyol obtained by ring-opening addition polymerization of an alkylene oxide, preferably propylene oxide, to such a compound.

The average number of hydroxyl groups in the polyol (B) is from 2 to 3. By adjusting the average number of hydroxyl groups to 2 to 3, the obtainable flexible polyurethane foam will be excellent in physical properties such as the dry set. Further, the obtainable flexible polyurethane foam will have good elongation and not high hardness, and it will be excellent in physical properties such as the tensile strength.

The average number of hydroxyl groups in the polyol (B) is preferably from 2.0 to 2.7, more preferably from 2.0 to 2.6. By adjusting the average number of hydroxyl groups in the polyol (B) within the above range, it is possible to control the rebound resilience to be low, and it is possible to obtain a flexible urethane foam having little change in hardness (having low temperature sensitivity).

Further, as the polyol (B), it is preferred to use a polyether diol having an average of 2 hydroxyl groups and a polyether triol having an average of 3 hydroxyl groups, in combination. The proportion of the polyether diol having an average of 2 hydroxyl groups in the polyol (B) is preferably at least 40 mass %.

The hydroxyl value of the polyol (B) is from 15 to 250 mgKOH/g. By adjusting the hydroxyl value to be at least 15 mgKOH/g, it is possible to constantly produce the flexible polyurethane foam by suppressing collapse, etc. Further, by adjusting the hydroxyl value to be at most 250 mgKOH/g, the obtainable flexible polyurethane foam will be excellent in flexibility, and the rebound resilience will be controlled to be low. The hydroxyl value of the polyol (B) is particularly preferably from 20 to 200 mgKOH/g.

The polyol (B) in the present invention may be a polymer-dispersed polyol. As the polymer for fine polymer particles, the same one as described above with respect to the polyol (A) may, for example, be mentioned. Further, the content of the fine polymer particles in the polymer-dispersed polyol is not particularly limited, but it is preferably from 0 to 50 mass %, more preferably from 0 to 20 mass %, based on the entire polyol (B).

Polyol (C)

The polyol (C) is a polyol having an average of from 2 to 6 hydroxyl groups and a hydroxyl value of from 251 to 1,830 mgKOH/g. The polyol to be used as the polyol (C) may, for example, be a polyhydric alcohol, an amine having from 2 to 6 hydroxyl groups, a polyester polyol, a polyether polyol or a polycarbonate polyol. when the polyol (C) is used, it functions as a crosslinking agent, whereby the mechanical properties such as the hardness of the obtainable flexible polyurethane foam will be improved. Further, in the present invention, it is observed that the polyol (C) has a cell-opening effect, and addition of the polyol (C) is effective to improve the air flow. Especially, also in a case where a flexible polyurethane foam having a low density (light weight) is to be produced by using a large amount of a blowing agent, the foam stability will be good.

The polyhydric alcohol may, for example, be ethylene glycol, propylene glycol, 1,4-butanediol, dipropylene glycol, glycerol, diglycerol, pentaerythritol or sobitol.

The amine having from 2 to 6 hydroxyl groups may, for example, be diethanolamine, triethanolamine, ethylene diamine or diethylene triamine.

The polyether polyol may, for example, be a polyether polyol obtained by ring-opening addition polymerization of an alkylene oxide to an initiator.

The initiator may, for example, be a polyhydric alcohol which may be used also as the polyol (C), or an initiator which may be used for the production of the polyol (B).

The alkylene oxide may, for example, be ethylene oxide, propylene oxide, 1,2-epoxybutane or 2,3-epoxybutane. Among them, propylene oxide or a combination of propylene oxide and ethylene oxide, is preferred. Particularly preferred is propylene oxide alone. Namely, as the polyol (C) which is a polyether polyol, a polyoxypropylene polyol obtained by ring-opening addition polymerization of only propylene oxide to an initiator, is preferred. As the polyol (C), a polyether polyol is preferred, and a polyoxypropylene polyol is particularly preferred, among them. By using propylene oxide alone, the obtainable flexible polyurethane foam will have excellent durability in a humidified state. As the polyol (C), one type may be used alone, or two or more types may be used in combination.

The polyol (C) has an average of from 2 to 6 hydroxyl groups, preferably from 3 to 4 hydroxyl groups. Further, the polyol (C) has a hydroxyl value of from 251 to 1,830 mgKOH/g, preferably from 300 to 600 mgKOH/g.

Monool (D)

The monool (D) in the present invention is a polyether monool having a hydroxyl value of from 5 to 200 mgKOH/g. Namely, it is a polyether monool obtained by ring-opening addition polymerization of an alkylene oxide to an initiator having one active hydrogen atom by using an alkylene oxide ring-opening addition polymerization catalyst.

The alkylene oxide ring-opening addition polymerization catalyst is preferably a double metal cyanide complex catalyst, a phosphazenium compound, a Lewis acid compound or an alkali metal compound catalyst. Among them, a double metal cyanide complex catalyst is particularly preferred. Namely, the monool (D) is preferably a polyether monool having a polyoxyalkylene chain, obtained by ring-opening addition polymerization of an alkylene oxide by using a double metal cyanide complex catalyst.

The alkylene oxide may, for example, be ethylene oxide, propylene oxide, 1,2-epoxybutane or 2,3-epoxybutane. Among them, propylene oxide, or a combination of propylene oxide and ethylene oxide, is preferred. Particularly preferred is propylene oxide alone. Namely, as the monool (D), a polyoxypropylene monool obtained by ring-opening addition polymerization of only propylene oxide to an initiator, is preferred. By using only propylene oxide, the obtainable flexible polyurethane foam will have excellent durability in a humidified state.

As the initiator, a compound having only one active hydrogen atom, is used. Specifically, it may, for example, be a monool such as methanol, ethanol, n-propyl alcohol, isopropyl alcohol, n-butyl alcohol or tert-butyl alcohol; a monohydric phenol such as phenol or nonylphenol; or a secondary amine such as dimethylamine or diethylamine.

The monool (D) has an average of one hydroxyl group. Further, the monool (D) has a hydroxyl value of from 5 to 200 mgKOH/g, preferably from 5 to 120 mgKOH/g.

Polyol Mixture

The polyol mixture is a mixture comprising the polyol (A) and the polyol (B), and it may further contain the polyol (C) and/or the monool (D).

The proportions of the polyol (A) and the polyol (B) are such that the proportion of the polyol (A) to the total (100 mass %) of the polyol (A) and the polyol (B) is preferably from 5 to 50 mass %, more preferably from 10 to 30 mass %. By adjusting the proportion of the polyol (A) in the polyol mixture to be within the above range, it is possible to obtain a flexible polyurethane foam having low rebound resilience and little change in hardness against a temperature change (having low temperature sensitivity) and excellent flame retardancy.

In the polyol mixture (100 mass %), the proportion of the total of the polyol (A) and the polyol (B) is preferably at least 75 mass %, more preferably at least 80 mass %. By adjusting the proportion of the total of the polyol (A) and the polyol (B) in the polyol mixture to be within the above range, it is possible to obtain a flexible polyurethane foam which has good air flow.

The proportion of the monool (D) is preferably at most 30 parts by mass, more preferably at most 25 parts by mass, most preferably from 0 to 25 parts by mass, per 100 parts by mass of the total of the polyol (A) and the polyol (B). By adjusting the proportion of the monool (D) to be within the above range, it is possible to obtain a flexible polyurethane foam having excellent durability and good air flow.

The proportion of the polyol (C) is preferably at most 10 parts by mass, more preferably at most 5 parts by mass, particularly preferably from 0 to 2 parts by mass, per 100 parts by mass of the total of the polyol (A) and the polyol (B). By adjusting the proportion of the polyol (C) within the above range, it is possible to improve air flow of a flexible polyurethane foam.

With respect to the polyol mixture, another polyol (E) may also be used which is not classified in any of the polyol (A), the polyol (B), the polyol (C) and the monool (D). The proportion of such another polyol (E) is preferably at most 10 parts by mass, more preferably at most 7 parts by mass, per 100 parts by mass of the total of the polyol (A) and the polyol (B).

The polyol (E) is preferably a polyol having an average of from 3.1 to 6.0 hydroxyl groups and a hydroxyl value of from 15 to 250 mgKOH/g. Namely, it may preferably be a polyoxypropyleneoxyethylene polyol having an oxyethylene group content of from 50 to 100 mass % in the oxyalkylene groups. The polyol (E) is preferably used within the above range, since it will be effective to improve the air flow, and when a flexible polyurethane foam is to be produced, the foam stability will be good.

A preferred composition of the polyol mixture may, for example, comprise from 5 to 50 parts by mass of the polyol (A), from 50 to 95 parts by mass of the polyol (B), from 0 to 10 parts by mass of the polyol (C), from 0 to 30 parts by mass of the monool (D) and from 0 to 5 parts by mass of the polyol (E) (wherein the total of (A) to (E) is 100 parts by mass).

Polyisocyanate Compound

The polyisocyanate compound may, for example, be an aromatic, alicyclic or aliphatic polyisocyanate having at least two isocyanate groups, a mixture of at least two such polyisocyanates, or a modified polyisocyanate obtainable by modifying such a polyisocyanate.

The polyisocyanate may, for example, be tolylene diisocyanate (TDI), diphenylmethane diisocyanate (MDI), polymethylenepolyphenyl polyisocyanate (so-called crude MDI), xylylene diisocyanate (XDI), isophorone diisocyanate (IPDI) or hexamethylene diisocyanate (HMDI). The modified polyisocyanate may, for example, be a prepolymer type modified product, a nurate modified product, a urea modified product or a carbodiimide modified product of the above polyisocyanates. Among them, TDI, MDI, crude MDI or a modified product thereof is preferred. Further, it is preferred to employ TDI, crude MDI or a modified product thereof (particularly preferred is a prepolymer type modified product) among them, since the foam stability will be improved, or the durability will be improved. Especially, when a polyisocyanate compound having a relatively low reactivity among TDIS, crude MDIs or modified products thereof, is used, the obtainable foam will be excellent in air flow. Specifically, a mixture of 2,4-TDI/2,6-TDI=80/20 mass % or a TDI mixture wherein the proportion of 2,6-TDI is large (particularly preferably at least 30 mass %), is preferred.

The amount of the polyisocyanate compound used, is shown by the isocyanate index. The isocyanate index is 100 times a numerical value obtained by dividing the equivalent amount of isocyanate groups in the polyisocyanate compound by the equivalent amount of the total of all active hydrogen atoms in polyols, water, etc. In the process for producing a flexible polyurethane foam of the present invention, the proportion of the polyol mixture and the polyisocyanate compound is adjusted to be at least 90 by the isocyanate index. When the isocyanate index is at least 90, the polyols will be properly used and the influence as the plasticizer will be proper, whereby the washing durability will be excellent.

Further, the urethane-forming catalyst is hardly dissipated, or the produced flexible polyurethane foam is unlikely discolored. The isocyanate index is preferably from 90 to 130, more preferably from 95 to 110, particularly preferably from 100 to 110.

Urethane-Forming Catalyst

As the urethane-forming catalyst, it is possible to use any catalyst which promotes the urethane-forming reaction, and it may, for example, be triethylamine, tripropylamine, polyisopropanolamine, tributylamine, trioctylamine, hexamethyldimethylamine, N-methylmorphorine, N-ethylmorphorine, N-octadecylmorphorine, diethylenetriamine, N,N,N',N'-tetramethylethylenediamine, N,N,N',N'-tetramethylpropylenediamine, N,N,N',N'-tetramethylbutanediamine, N,N,N',N'-tetramethyl-1,3-butanediamine, N,N,N',N'-tetramethylhexamethylenediamine, bis[2-(N,N-dimethylamino)ethyl]ether, N,N-diemthylbenzylamine, N,N-dimethylcyclohexylamine, N,N,N',N'-pentamethyldiethylenetriamine or triethylenediamine; an organic salt or an inorganic salt of such compounds; an oxyalkylene adduct of an amino group of a primary or secondary amine; an azacyclic compound such as a N,N-dialkylpiperazine; or various N,N', N''-trialkylaminoalkylhexahydrotriazine.

Further, it may, for example, be a metal carboxylate such as potassium acetate or potassium 2-ethylhexanoate, or an organic metal compound such as tin acetate, tin octylate, tin oleate, tin laurylate, dibutyltin diacetate, dibutyltin dilaurate, dibutyltin dichloride, lead octanoate, lead naphthenate, nickel naphthenate or cobalt naphthenate.

Foam Stabilizer

The flexible polyurethane foam of the present invention may be produced without using a foam stabilizer, but it is preferred to use one from a viewpoint such that the foam stability during the production of the flexible polyurethane foam will be improved, and good foams will be formed.

As a foam stabilizer, a silicone foam stabilizer or a fluorinated foam stabilizer may, for example, be mentioned. Among them, a silicone foam stabilizer is preferred. Among silicone foam stabilizers, a silicone foam stabilizer containing a polyoxyalkylene/dimethylpolysiloxane copolymer as the main component, is preferred. The foam stabilizer may be a polyoxyalkylene/dimethylpolysiloxane copolymer alone, or a mixture containing another component in combination therewith. Such another component may, for example, be a polyalkylmethylsiloxane, a glycol or a polyoxyalkylene compound. As a foam stabilizer, a foam stabilizer mixture comprising a polyoxyalkylene/dimethylpolysiloxane copolymer, a polyalkylmethylsiloxane and a polyoxyalkylene compound, is particularly preferred from the viewpoint of the stability of the foam. Such a foam stabilizer mixture may, for example, be one known by trade name SZ-1127, L-580, L-520, SZ-1919, L-5740S, L-5740M, SZ-1111, SZ-1127, SZ-1162, SZ-1105, SZ-1328, SZ-1325, SZ-1330, SZ-1306, SZ-1327, SZ-1336, SZ-1339, L-3601, SZ-1302, SH-192, SF-2909, SH-194, SH-190, SRX-280A, SRX-298, SF-2008, SF-2904, SRX-294A, SF-2965, SF-2962, SF-2961, SRX-274C, SF-2964, SF-2969, PRX-607, SZ-1711, SZ-1666, SZ-1627, SZ-1710, L-5420, L-5421, SZ-1669, SZ-1649, SZ-1654, SZ-1642, SZ-1720 or SH-193 manufactured by Dow Corning Toray Co., Ltd., F-114, F-121, F-122, F-348, F-341, F-502, F-506, F-607 or F-606 manufactured by Shin-Etsu Chemical Co., LTD, Y-10366, L-5309 or L-650 manufactured by Momentive Performance Materials Japan Inc, or B-8110, B-8017, B-4113, B-8727LF, B-8715LF, B-8404, B-8462, B-8716LF or B-8229 manufactured by Goldschmidt. Two or more of such foam stabilizers may be used in combination, or a foam stabilizer other than the above specified foam stabilizers may be used in combination.

The amount of the foam stabilizer to be used is preferably from 0 to 2 parts by mass, more preferably from 0.1 to 0.5 part by mass, per 100 parts by mass of the polyol mixture.

Blowing Agent

The blowing agent may, for example, be a known blowing agent such as water, an inert gas or a fluorinated hydrocarbon.

As a blowing agent, water or an inert gas is preferred. The inert gas may, for example, be air, nitrogen or carbon dioxide. Among them, water is preferred. That is, in the present invention, it is particularly preferred to use only water as the blowing agent.

The amount of the blowing agent to be used, when water is used, is preferably at most 10 parts by mass, more preferably from 0.1 to 4 parts by mass, per 100 parts by mass of the polyol mixture.

Other Additives

At the time of producing a flexible polyurethane foam of the present invention, desired additives may also be used in addition to the above-described urethane-forming catalyst, blowing agent and foam stabilizer. As such additives, a filler such as potassium carbonate or barium sulfate; a surfactant such as an emulsifier; an aging-preventive agent such as an antioxidant or an ultraviolet absorber; a flame retardant which is used as an auxiliary agent if necessary, a plasticizer, a coloring agent, an antifungal agent, a cell opener, a dispersant and a discoloration-preventive agent may, for example, be mentioned.

Mixing Method

The method for mixing various components may be a method (mold method) wherein the various components are injected into a sealed mold, and a reactive mixture is foamed, or a method (slab method) wherein the various components are mixed in an open system and a reactive mixture is foamed. A slab method is preferred. Specifically, a known method such as a one shot method, a semiprepolymer method or a prepolymer method, may be preferably mentioned. For the production of a flexible polyurethane foam, it is possible to use a production apparatus which is commonly employed.

Flexible Polyurethane Foam

The flexible polyurethane foams obtained by such methods, pass Flammability Test of Interior Decorating Materials for Cars (FMVSS-302), and some of them also pass Flammability Test of Materials for Electricity, U.S.A. (UL94).

The air flow of the flexible polyurethane foam is preferably from 20 to 100 L/min, more preferably from 30 to 100 L/min, particularly preferably from 70 to 100 L/min. The air flow being in the above range means that the constant amount of the air flow is secured even in a compressed state. That is, when the foam is used in an application for beddings, it is less likely humidified. The measurement of the air flow is carried out in accordance with JIS K 6400 (1997 Edition).

The durability of the flexible polyurethane foam is shown by the dry set and the wet set. The wet set is an index of durability in a humid state. Both of the measurement of the dry set and the wet set, are carried out in accordance with JIS K 6400 (1997 Edition). The dry set of a flexible polyurethane foam is preferably at most 5%, more preferably at most 4%, particularly preferably at most 3.5%. The wet set of the flexible polyurethane foam is preferably at most 5%, more preferably at most 4%, particularly preferably at most 3.5%.

The weather resistance of the flexible polyurethane foam is evaluated by the mass reduction rate of a sample which was exposed to ultraviolet rays for a long time and by the flammability test. The mass reduction rate (%) is represented by [(mass before the test (g)−mass after exposure to ultraviolet rays (g))/mass before the test (g)]×100. The mass reduction rate after exposure to ultraviolet rays for 520 hours is preferably at most 6%, more preferably at most 5%.

The flammability test which shows the flame retardancy of the flexible polyurethane foam, is represented by a combustion distance (mm) of UL94 Flammability Test after exposure to ultraviolet rays. The combustion distance after exposure to ultraviolet rays for 520 hours is preferably at most 5 mm, more preferably 0 mm.

The density of the flexible polyurethane foam (core density) is preferably from 40 to 110 kg/m$^3$, more preferably from 40 to 80 kg/m$^3$. The production process of the present invention is characterized in that it is capable of constantly foaming and producing even a foam having a low density, and the obtained foam is excellent in durability. The measurement of the density is carried out in accordance with JIS K 6400 (1997 Edition).

EXAMPLES

Now, the present invention will be described in further detail with reference to Examples, but the present invention is by no means restricted by the following Examples. Further, "parts" in Examples and Comparative Examples represent "parts by mass."

Total Amount of Zn and Co in Polyol

The total amount of Zn and Co in a polyol was obtained by carrying out the following measurement.

20 g of a polyol was weighed in a platinum dish and burned and incinerated by a gas burner, and then, further incinerated completely in an electric furnace at 600° C. Incineration residue was dissolved in 2 mL of 6N hydrochloric acid and adjusted to a volume of 100 mL with distilled water. The amounts of Zn and Co contained in the incinerated residue were measured by an atomic absorption photometer (AA-6200 manufactured by Shimadzu Corporation). Determination of the amounts of Zn and Co was made based on a calibration curve prepared by using a standard solution of the metals.

Further, with respect to a polyol produced by using an alkali metal or alkaline earth metal catalyst, the amounts of Zn and Co were measured by an atomic absorption photometer but were not detected.

Materials

Polyol A1: Using a potassium hydroxide catalyst and dipropylene glycol as an initiator, propylene oxide was subjected to ring-opening addition polymerization to a molecular weight of 700, followed by purification with magnesium silicate. Then, using the compound as an initiator, propylene oxide was subjected to ring-opening addition polymerization by using zinc hexacyanocobaltate-tert-butyl alcohol complex catalyst, to obtain a polyoxypropylene polyol having an average of 2 hydroxyl groups, a hydroxyl value of 20 mgKOH/g, an unsaturation is value of 0.005 meq/g and 10.5 ppm of the total amount of Zn and Co.

Polyol A2: Using a potassium hydroxide catalyst and dipropylene glycol as an initiator, propylene oxide was subjected to ring-opening addition polymerization to a molecular weight of 700, followed by purification with magnesium silicate. Then, using the compound as an initiator, propylene oxide was subjected to ring-opening addition polymerization by using zinc hexacyanocobaltate-tert-butyl alcohol complex catalyst, to obtain a polyoxypropylene polyol having an average of 2 hydroxyl groups, a hydroxyl value of 20 mgKOH/g, an unsaturation value of 0.005 meq/g and 50.0 ppm of the total amount of Zn and Co.

Polyol A3: Using a potassium hydroxide catalyst and dipropylene glycol as an initiator, propylene oxide was subjected to ring-opening addition polymerization to a molecular weight of 700, followed by purification with magnesium silicate. Then, using the compound as an initiator, propylene oxide was subjected to ring-opening addition polymerization by using a zinc hexacyanocobaltate-tert-butyl alcohol complex catalyst, to obtain a polyoxypropylene polyol having an average of 2 hydroxyl groups, a hydroxyl value of 28 mgKOH/g, an unsaturation value of 0.007 meq/g and 11.0 ppm of the total amount of Zn and Co.

Polyol A4: Using a potassium hydroxide catalyst and dipropylene glycol as an initiator, propylene oxide was subjected to ring-opening addition polymerization to a molecular weight of 1,000, followed by purification with magnesium silicate. Then, using the compound as an initiator, propylene oxide was subjected to ring-opening addition polymerization by using a zinc hexacyanocobaltate-tert-butyl alcohol complex catalyst, to obtain a polyoxypropylene polyol having an average of 2 hydroxyl groups, a hydroxyl value of 14 mgKOH/g, an unsaturation value of 0.005 meq/g and 12.0 ppm of the total amount of Zn and Co.

Polyol a1: To the polyol A1, magnesium silicate was added, followed by purification by absorption and filtration, thereby to obtain a polyoxypropylene polyol having an average of 2 hydroxyl groups, a hydroxyl value of 20 mgKOH/g, an unsaturation value of 0.005 meq/g and 0.4 ppm of the total amount of Zn and Co.

Polyol a2: Using a potassium hydroxide catalyst and dipropylene glycol as an initiator, propylene oxide was subjected to ring-opening addition polymerization to a molecular weight of 700, followed by purification with magnesium silicate. Then, using the compound as an initiator, propylene oxide was subjected to ring-opening addition polymerization by using a cesium hydroxide catalyst, to obtain a polyoxypropylene polyol having an average of 2 functional groups, a hydroxyl value of 28 mgKOH/g and an unsaturation value of 0.027 meq/g.

Polyol a3: Using a potassium hydroxide catalyst and dipropylene glycol as an initiator, propylene oxide was subjected to ring-opening addition polymerization to obtain polyoxypropylene polyol having an average of 2 functional groups, a hydroxyl value of 19 mgKOH/g and an unsaturation value of 0.11 meq/g.

Polyol B1: Using a potassium hydroxide catalyst and dipropylene glycol as an initiator, propylene oxide was subjected to ring-opening addition polymerization to obtain a polyoxypropylene polyol having an average of 2 hydroxyl groups and a hydroxyl value of 160 mgKOH/g.

Polyol B2: Using a potassium hydroxide catalyst and glycerol as an initiator, propylene oxide was subjected to ring-opening addition polymerization to obtain a polyoxypropylene polyol having an average of 3 hydroxyl groups and a hydroxyl value of 168 mgKOH/g.

Polyol B3: Using a potassium hydroxide catalyst and glycerol as an initiator, propylene oxide was subjected to ring-opening addition polymerization to a molecular weight of 1,000, followed by ring-opening addition polymerization of the mixture of ethylene oxide and propylene oxide (mass ratio of 10:90) to obtain a polyether polyol. In the polyether polyol, acrylonitrile and styrene were copolymerized, to obtain a fine polymer particles dispersed polyol having an amount of 42 mass % of the fine polymer particles, an average of 3 hydroxyl groups and an hydroxyl value of 31 mgKOH/g.

Polyol B4: Using a potassium hydroxide catalyst and glycerol as an initiator, a mixture of propylene oxide and ethylene oxide was subjected to ring-opening addition polymerization to obtain polyoxypropylene oxyethylene polyol having an average of 3 hydroxyl groups, an hydroxyl value of 48 mgKOH/g and a total oxyethylene group content of 80 mass %.

Polyol B5: Using a potassium hydroxide catalyst and glycerol as an initiator, propylene oxide was subjected to ring-opening addition polymerization to obtain a polyoxypropylene polyol having an average of 3 hydroxyl groups and a hydroxyl value of 112 mgKOH/g.

Polyol B6: Using a potassium hydroxide catalyst and dipropylene glycol as an initiator, propylene oxide was subjected to ring-opening addition polymerization to obtain a polyoxypropylene polyol having an average of 2 hydroxyl groups and a hydroxyl value of 75 mgKOH/g.

Polyol C1: Using a potassium hydroxide catalyst and pentaerythritol as an initiator, propylene oxide was subjected to ring-opening addition polymerization, to obtain a polyoxypropylene polyol having an average of 4 hydroxyl groups and a hydroxyl value of 410 mgKOH/g.

Monool D1: Using a zinc hexacyanocobaltate-tert-butyl alcohol complex catalyst and n-butanol as an initiator, propylene oxide was subjected to ring-opening addition polymerization to obtain a polyoxypropylene monool having an average of 1 hydroxyl group, a hydroxyl value of 17 mgKOH/g and 14.3 ppm of the total of Zn and Co.

Monool D2: Using a zinc hexacyanocobaltate-tert-butyl alcohol complex catalyst and n-butanol as an initiator, propylene oxide was subjected to ring-opening addition polymerization to obtain a polyoxypropylene monool having an average of 1 hydroxyl group, a hydroxyl value of 28 mgKOH/g and 12.5 ppm of the total of Zn and Co.

Monool D3: Using potassium hydroxide and n-butanol as an initiator, propylene glycol was subjected to ring-opening polymerization to obtain a polyoxypropylene monool having an average of 1 functional group and a hydroxyl value of 56.

Polyol E1: Polyoxypropylene oxyethylene polyol having an average of 4 hydroxyl groups, a hydroxyl value of 28 mgKOH/g and a total oxyethylene group content of 80 mass %.

Blowing agent: Water

Catalyst a: Amine catalyst (tradename: Niax A-230, manufactured by Air Products and Chemicals, Inc.)

Catalyst b: Solution of triethylenediamine in dipropylene glycol (tradename: TEDA-L33, manufactured by TOSOH CORPORATION)

Catalyst c: Amine catalyst (tradename: Toyocat-ETF, manufactured by TOSOH CORPORATION)

Catalyst d: Tin 2-ethylhexanoate (tradename: DABCO T-9, manufactured by Air Products and Chemicals, Inc.)

Catalyst e: Dibutyltin dilaurate (tradename: NEOSTANN U-100, manufactured by Nitto Kasei Co., Ltd.)

Foam stabilizer a: Silicone foam stabilizer (tradename: SZ-1328, manufactured by Dow Corning Toray Co., Ltd.)

Foam stabilizer b: Silicone foam stabilizer (tradename: L-5740S, manufactured by Dow Corning Toray Co., Ltd.)

Foam stabilizer c: Silicone foam stabilizer (tradename: B-8716LF, manufactured by Goldschmidt)

Foam stabilizer d: Silicone foam stabilizer (tradename: B-8229, manufactured by Goldschmidt)

Foam stabilizer e: Silicone foam stabilizer (tradename: L-650, manufactured by Momentive Performance Materials Japan Inc)

Flame retardant a: Halogen-containing condensed phosphate (tradename: CR-504L, manufactured by Daihachi Chemical Industry Co., Ltd.)

Polyisocyanate compound a: TDI-80 (mixture of 2,4-TDI/ 2,6-TDI=80/20 mass %), isocyanate group content: 48.3 mass % (tradename: CORONATE T-80, manufactured by Nippon Polyurethane Industry Co., Ltd.)

Polyisocyanate compound b: TDI-65 (mixture of 2,4-TDI/2,6-TDI=65/35 mass %), isocyanate group content: 48.3 mass % (tradename: CORONATE T-65, manufactured by Nippon Polyurethane Industry Co., Ltd.)

Polyisocyanate compound c: TDI-100 (compound of 2,4-TDI=100 mass %), isocyanate group content: 48.3 mass % (tradename: CORONATE T-100, manufactured by Nippon Polyurethane Industry Co., Ltd.)

Polyisocyanate compound d: mixture of TDI (mixture of 2,4-tolylene diisocyanate/2,6-tolylene diisocyanate=80/20 mass %) 80 mass % and polymethylenepolyphenyl polyisocyanate 20 mass %, isocyanate group content: 44.8 mass % (tradename: CORONATE 1021, manufactured by Nippon Polyurethane Industry Co., Ltd.)

Slab Method

Examples 1 to 29 and 33 to 39

A mixture (polyol system) of all materials other than the polyisocyanate compound among the materials and blend agents shown in Tables 1 to 5 and 7, was adjusted to a liquid temperature of 23° C.±1° C., and the polyisocyanate compound was adjusted to a liquid temperature of 22±1° C. To the polyol system, the polyisocyanate compound was added in a prescribed amount, followed by mixing for 5 seconds by a mixer (rotational speed: 1,600 rpm), and the mixture was injected at room temperature into a wooden box of an optional size with an open top and lined with a plastic sheet, to produce a flexible polyurethane foam. After the surface hardened, the surface of the flexible polyurethane foam was subjected to crushing by a hand. Then, the flexible polyurethane foam was left to stand for 24 hours in a room adjusted to have room temperature (23° C.) and a humidity of 50%, whereupon various physical properties were measured. The measured results are shown in Tables 1 to 5 and 7. Here, Examples 1 to 8, 12 to 28, 33 to 37 and 39 are Examples of the present invention, and Examples 9 to 11, 29 and 38 are Comparative Examples.

Core Density

The core density was measured by a method in accordance with JIS K6400 (1997 Edition). A sample obtained by removing the skin portion from the center portion of the foam, followed by cutting into a size of 100 mm in length, 100 mm in width and 50 mm in height, was used for the measurement.

Air Flow

The air flow (unit: L/min) was measured by the method B in accordance with JIS K6400 (1997 Edition).

25% Hardness, Tensile Strength, Elongation, Dry Set and Wet Set

The 25% hardness (ILD) (unit: N/314 cm$^2$), tensile strength (unit: kPa), elongation (unit: %), dry set (50% Compressed Dry Set) (unit: %) and wet set (50% Compressed Wet Set) (unit: %) were measured by methods in accordance with JIS K6400 (1997 Edition).

CLD Hardness, Change in Hardness

The CLD hardness was measured by a method in accordance with JIS K6400 (1997 Edition). However, the temperature for the measurement was room temperature (23° C.). Further, the change in hardness (unit: %) was calculated from the CLD hardness measured at room temperature (23° C.) and the CLD hardness measured at a low temperature (−5° C.). Namely, the proportion (%) of the increase in the CLD hardness measured at −5° C. against the CLD hardness measured at 23° C. was obtained.

Rebound Resilience of Core

The rebound resilience of the core (unit: %) was measured by a method in accordance with JIS K6400 (1997 Edition). A sample obtained by removing the skin portion from the center portion of the foam, followed by cutting into a size of 100 mm in length, 100 mm in width and 50 mm in height, was used for the measurement.

Evaluation of Flammability by FMVSS-302

The evaluation of flammability by Flammability Test FMVSS-302, was carried out in accordance with the specification of FMVSS-302 (flame retardancy of interior decorating materials for cars). A foam specimen (150 mm in length, 50 mm in width and 10 mm in thickness) was held horizontally, and one end was brought in contact with a flame of a gas burner for 15 seconds. Then, after the flame was removed, the flammability was evaluated in accordance with a method of the horizontal test. Namely, after the flame was removed, if the fire of the foam specimen extinguished immediately by itself (shown as N.B.), or if the combustion rate was at most 100 mm/min, such was designated as "passed", and if the rate was beyond 100 mm/min, such was designated as "failed."

Evaluation of Flammability by UL Standard

The evaluation of flame retardancy by the UL standard was carried out in accordance with the Horizontal Flammability Test of UL94. At 25 mm, 60 mm and 125 mm from one end of a foam specimen, reference lines were drawn, and the end of the specimen which was closer to the 60 mm reference line, was placed to be in contact with a bended portion of a metal mesh. A blue flame of 38±2 mm of a gas burner was immediately located at the end of the bended portion of a metal mesh, followed by combustion. After a test flame was used for 60±1 seconds, the gas burner was removed, and the measurement of time was started. When the flame reached at the 25 mm reference line, another timer was started.

Judgment was made on such a basis that between the mm reference line and the 125 mm reference, if the combustion rate was at most 40 mm/min, or if the combustion stopped before the 125 mm reference line (shown as HBF), such was designated to be as "good", other than that was designated as "failed."

Evaluation of Weather Resistance

The evaluation of weather resistance was carried out by using Sunshine Weather Meter (model: S80, manufactured by SUGA TEST INSTRUMENTS CO., LTD.) at a black panel temperature of 63° C. for 9 minutes in a rainfall cycle of 60 minutes. A sample for the evaluation was a sheet type product having 10×70×150 mm, which was exposed to ultraviolet rays for 130, 260 and 520 hours and then, was taken out, whereupon the evaluation was carried out by a change in mass and a flammability test.

Change in mass (%)=[(mass (g) before test−mass (g) after exposure to ultraviolet rays)/mass (g) before test]×100, and a flammability test is shown by a combustion distance (mm) of UL94 Flammability Test. The evaluation results are shown in Table 8.

Mold Method

Examples 30 to 32

A mixture (polyol system) of all materials other than the polyisocyanate compound among the materials and blend agents shown in Table 6, was adjusted to a liquid temperature of 23° C.±1° C., and the polyisocyanate compound was adjusted to a liquid temperature of 22±1° C. To the polyol system, the polyisocyanate compound was added in a prescribed amount, followed by mixing for 5 seconds by a mixer (rotational speed: 3,000 rpm), and the mixture was immediately injected into a mold having an internal dimension of 400 mm in length, 400 mm in width and 100 mm in height, which was heated at 60° C., followed by sealing. After curing for a prescribed period of time, the flexible polyurethane foam was taken out and left to stand for at least 24 hours, whereupon various physical properties were measured. The measured results are shown in Table 6. Here, Examples 30 to 32 are Examples of the present invention.

Properties of Foam

The properties of the foam were evaluated for the total density (unit: kg/m$^3$), core density (unit: kg/m$^3$), 25% hardness (ILD) (unit: N/314 cm$^2$), rebound resilience of core (unit: %), air flow (unit: L/min), tensile strength (unit: kPa), elongation (unit: %), dry set (50% Compression Dry Set) (unit: %), wet set (50% Compression Wet Set) (unit: %) and hysteresis loss (unit: %).

With respect to the core density and the rebound resilience of core, the measurements were carried out by using a sample obtained by removing the surface portion (skin portion) from the center portion of the foam, followed by cutting into a size of 100 mm in length, 100 mm in width and 50 mm in height.

Here, the total density, core density, 25% hardness (ILD), rebound resilience of core, tensile strength, elongation, dry set, wet set and hysteresis loss, were measured in accordance with JIS K 6400 (1997 Edition).

Air flow was measured by the method B in accordance with JIS K 6400 (1997 Edition).

Further, the evaluation of flammability by FMVSS-302 and the Horizontal Flammability Test of UL94, were carried out for a surface layer (skin layer) of the obtained foam.

Curability

The evaluation of curability was made such that when ends of a urethane foam were squeezed by a hand during demolding, if it completely returns to its original state, such is designated by ○, and if it stays as squeezed, such is designated by X.

Crushing Property

The evaluation of a crushing property was made such that when a foam was subjected to crushing with a hand during demolding, if the inside of the urethane foam does not break, such is designated by ○, and if it breaks, such is designated by X.

TABLE 1

|  |  | Ex. 1 | Ex. 2 | Ex. 3 |
|---|---|---|---|---|
| Polyol A1 | Parts | 20 |  | 21.1 |
| Polyol a1 | Parts |  |  |  |
| Polyol A2 | Parts |  | 20 |  |
| Polyol A3 | Parts |  |  |  |
| Polyol a2 | Parts |  |  |  |
| Polyol a3 | Parts |  |  |  |
| Polyol B1 | Parts | 40 | 40 | 42.1 |
| Polyol B2 | Parts | 40 | 40 | 36.8 |
| Polyol B3 | Parts |  |  |  |
| Monool D1 | Parts |  |  | 5 |
| Monool D2 | Parts |  |  |  |
| Monool D3 | Parts |  |  |  |
| Polyol C1 | Parts |  |  | 2.5 |
| Blowing agent | Parts | 1.4 | 1.4 | 1.26 |
| Catalyst a | Parts | 0.6 | 0.6 | 0.6 |
| Catalyst b | Parts |  |  |  |
| Foam stabilizer a | Parts | 0.25 | 0.25 | 0.25 |
| Catalyst d | Parts | 0.4 | 0.4 | 0.4 |
| Polyisocyanate compound a | Isocyanate index | 102.5 | 102.5 | 102.5 |
| Polyisocyanate compound b | Isocyanate index |  |  |  |

TABLE 1-continued

| Size of foams (length × width) | mm | 250 × 250 | 250 × 250 | 250 × 250 |
|---|---|---|---|---|
| Total amount of Zn/Co in polyol mixture | ppm | 2.1 | 10 | 2.73 |
| Form shrinkage |  | ○ | ○ | ○ |
| Core density | kg/m$^3$ | 70.5 | 70.9 | 76.3 |
| 25% ILD | N/314 cm$^2$ | 76 | 75 | 58 |
| Air flow | L/min | 43 | 20 | 22 |
| Tensile strength | kPa | 128 | 127 | 149 |
| Elongation | % | 203 | 202 | 210 |
| Dry set | % | 2.2 | 3.6 | 4.2 |
| Wet set | % | 1.4 | 1.2 | 1.1 |
| Rebound resilience of core | % | 18 | 18 | 10 |
| Change in hardness (−5° C./23° C.) | % | 8.5 | 9.1 | 24.1 |
| FMVSS-302 |  | Passed (N.B.) | Passed (N.B.) | Passed (N.B.) |

|  |  | Ex. 4 | Ex. 5 | Ex. 6 |
|---|---|---|---|---|
| Polyol A1 | Parts | 21.1 | 21.1 |  |
| Polyol a1 | Parts |  |  |  |
| Polyol A2 | Parts |  |  |  |
| Polyol A3 | Parts |  |  | 20.5 |
| Polyol a2 | Parts |  |  |  |
| Polyol a3 | Parts |  |  |  |
| Polyol B1 | Parts | 42.1 | 42.1 | 41 |
| Polyol B2 | Parts | 36.8 | 36.8 | 38.5 |
| Polyol B3 | Parts |  |  |  |
| Monool D1 | Parts |  |  |  |
| Monool D2 | Parts | 5 |  |  |
| Monool D3 | Parts |  | 5 |  |
| Polyol C1 | Parts |  |  | 2.5 |
| Blowing agent | Parts | 1.26 | 1.26 | 1.23 |
| Catalyst a | Parts | 0.6 | 0.6 | 0.6 |
| Catalyst b | Parts |  |  |  |
| Foam stabilizer a | Parts | 0.25 | 0.25 | 0.25 |
| Catalyst d | Parts | 0.4 | 0.4 | 0.4 |
| Polyisocyanate compound a | Isocyanate index | 105 | 105 | 105 |
| Polyisocyanate compound b | Isocyanate index |  |  |  |
| Size of foams (length × width) | mm | 250 × 250 | 250 × 250 | 250 × 250 |
| Total amount of Zn/Co in polyol mixture | ppm | 2.71 | 2.11 | 2.2 |
| Form shrinkage |  | ○ | ○ | ○ |
| Core density | kg/m$^3$ | 82.5 | 80.7 | 78.9 |
| 25% ILD | N/314 cm$^2$ | 59 | 44 | 83 |
| Air flow | L/min | 30 | 56 | 16 |
| Tensile strength | kPa | 128 | 108 | 120 |
| Elongation | % | 246 | 253 | 189 |
| Dry set | % | 3.7 | 3.8 | 3.9 |
| Wet set | % | 2 | 3.3 | 3.5 |
| Rebound resilience of core | % | 7 | 8 | 10 |
| Change in hardness (−5° C./23° C.) | % | 7.1 | 8.2 | 22.1 |
| FMVSS-302 |  | Passed (N.B.) | Passed (N.B.) | Passed (N.B.) |

TABLE 2

|  |  | Ex. 7 | Ex. 8 | Ex. 27 |
|---|---|---|---|---|
| Polyol A1 | Parts | 20 | 21.1 |  |
| Polyol a1 | Parts |  |  |  |
| Polyol A2 | Parts |  |  |  |
| Polyol A3 | Parts |  |  |  |
| Polyol a2 | Parts |  |  |  |
| Polyol a3 | Parts |  |  |  |
| Polyol A4 | Parts |  |  | 25 |
| Polyol B1 | Parts | 40 | 42.1 | 35 |

TABLE 2-continued

|  |  |  |  |  |
|---|---|---|---|---|
| Polyol B2 | Parts | 25 | 36.8 | 40 |
| Polyol B3 | Parts | 15 | | |
| Monool D1 | Parts | | 5 | 20 |
| Monool D2 | Parts | | | |
| Monool D3 | Parts | | | |
| Polyol C1 | Parts | | | |
| Blowing agent | Parts | 1.1 | 1.47 | 1.6 |
| Catalyst a | Parts | | 0.6 | |
| Catalyst b | Parts | 1.6 | | 1.71 |
| Catalyst c | Parts | | | 0.11 |
| Foam stabilizer a | Parts | 0.6 | 0.25 | |
| Foam stabilizer b | Parts | | | 0.34 |
| Catalyst d | Parts | 0.1 | 0.4 | |
| Polyisocyanate compound a | Isocyanate index | 102 | | 107 |
| Polyisocyanate compound b | Isocyanate index | | 102 | |
| Size of foams (length × width) | mm | 250 × 250 | 250 × 250 | 1000 × 2000 |
| Total amount of Zn/Co in polyol mixture | ppm | 2.1 | 2.79 | 4.89 |
| Form shrinkage | | ○ | ○ | ○ |
| Core density | kg/m³ | 82.3 | 59.7 | 58.5 |
| 25% ILD | N/314 cm² | 90 | 72 | 74 |
| Air flow | L/min | 40 | 19 | 34 |
| Tensile strength | kPa | 130 | 130 | 69 |
| Elongation | % | 188 | 223 | 220 |
| Dry set | % | 4.1 | 3.3 | 2.4 |
| Wet set | % | 3.2 | 2.3 | 3.6 |
| Rebound resilience of core | % | 10 | 11 | 13 |
| Change in hardness (−5° C./23° C.) | % | 10.9 | 11.3 | 4.8 |
| FMVSS-302 | | Passed (N.B.) | Passed (N.B.) | Passed (N.B.) |

|  |  | Ex. 28 | Ex. 9 | Ex. 10 | Ex. 11 |
|---|---|---|---|---|---|
| Polyol A1 | Parts | | | | |
| Polyol a1 | Parts | | 20 | | |
| Polyol A2 | Parts | | | | |
| Polyol A3 | Parts | | | | |
| Polyol a2 | Parts | | | 20.5 | |
| Polyol a3 | Parts | | | | 20 |
| Polyol A4 | Parts | 29.2 | | | |
| Polyol B1 | Parts | 40.8 | 40 | 41 | 40 |
| Polyol B2 | Parts | 30 | 40 | 38.5 | 40 |
| Polyol B3 | Parts | | | | |
| Monool D1 | Parts | 5 | | | |
| Monool D2 | Parts | | | | |
| Monool D3 | Parts | | | | |
| Polyol C1 | Parts | | | 2.5 | |
| Blowing agent | Parts | 1.4 | 1.4 | 1.23 | 1.4 |
| Catalyst a | Parts | | 0.6 | 0.6 | 0.6 |
| Catalyst b | Parts | 1.5 | | | |
| Catalyst c | Parts | | | | |
| Foam stabilizer a | Parts | | 0.25 | 0.25 | 0.25 |
| Foam stabilizer b | Parts | 0.3 | | | |
| Catalyst d | Parts | | 0.4 | 0.4 | 0.4 |
| Polyisocyanate compound a | Isocyanate index | 102 | 102.5 | 105 | 102.5 |
| Polyisocyanate compound b | Isocyanate index | | | | |
| Size of foams (length × width) | mm | 1000 × 2000 | 250 × 250 | 250 × 250 | 250 × 250 |
| Total amount of Zn/Co in polyol mixture | ppm | 4.02 | 0.08 | 0 | 0 |
| Form shrinkage | | ○ | X | X | X |
| Core density | kg/m³ | 59.9 | | | |
| 25% ILD | N/314 cm² | 58 | | | |
| Air flow | L/min | 40 | | | |
| Tensile strength | kPa | 82 | | | |
| Elongation | % | 309 | | | |
| Dry set | % | 6.6 | | | |
| Wet set | % | 6.6 | | | |
| Rebound resilience of core | % | 13 | | | |
| Change in hardness (−5° C./23° C.) | % | 5.5 | | | |
| FMVSS-302 | | Passed (N.B.) | | | |

TABLE 3

|  |  | Ex. 12 | Ex. 13 | Ex. 14 |
|---|---|---|---|---|
| Polyol A4 | Parts | 25 | 25 | 25 |
| Polyol B1 | Parts | 30 | 35 | 35 |
| Polyol B2 | Parts | 40 | 40 | 40 |
| Monool D1 | Parts | 5 | 5 | 5 |
| Blowing agent | Parts | 1.2 | 1 | 1.4 |
| Catalyst a | Parts | 0.3 | 0.3 | 0.3 |
| Catalyst b | Parts | | | |
| Catalyst c | Parts | | | |
| Foam stabilizer a | Parts | 0.3 | 0.3 | 0.3 |
| Foam stabilizer b | Parts | | | |
| Catalyst e | Parts | 0.2 | 0.2 | 0.2 |
| Polyisocyanate compound c | Isocyanate index | | | |
| Polyisocyanate compound a | Isocyanate index | 102 | 102 | 102 |
| Size of foams (length × width) | mm | 1000 × 2000 | 1000 × 2000 | 1000 × 2000 |
| Total amount of Zn/Co in polyol mixture | ppm | 3.54 | 3.54 | 3.54 |
| Form shrinkage | | ○ | ○ | ○ |
| Core density | kg/m³ | 66.1 | 83.5 | 57.8 |
| 25% ILD | N/314 cm² | 69 | 90 | 60 |
| Air flow | L/min | 60 | 40 | 83 |
| Tensile strength | kPa | 60 | 75 | 77 |
| Elongation | % | 243 | 203 | 249 |
| Dry set | % | 3.8 | 4 | 3.5 |
| Wet set | % | 4.5 | 1.6 | 4.6 |
| Rebound resilience of core | % | 10 | 15 | 9 |
| Change in hardness (−5° C./23° C.) | % | 6.9 | 5.5 | 7.2 |
| FMVSS-302 | | Passed (N.B.) | Passed (N.B.) | Passed (N.B.) |
| UL 94 Combustion distance | mm | 0 | 0 | 3 |
| Combustion time | sec | 0 | 0 | 9 |
| Combustion rate | mm/min | 0 | 0 | 20 |
| judgment | | HBF Passed | HBF Passed | HBF Passed |

|  |  | Ex. 15 | Ex. 16 | Ex. 17 |
|---|---|---|---|---|
| Polyol A4 | Parts | 29.2 | 29.2 | 25 |
| Polyol B1 | Parts | 40.8 | 40.8 | 35 |
| Polyol B2 | Parts | 30 | 30 | 40 |
| Monool D1 | Parts | 10 | 10 | 5 |
| Blowing agent | Parts | 1 | 1 | 1 |
| Catalyst a | Parts | 0.3 | 0.3 | 0.3 |
| Catalyst b | Parts | | | |
| Catalyst c | Parts | | | |
| Foam stabilizer a | Parts | 0.3 | 0.3 | 0.3 |
| Foam stabilizer b | Parts | | | |
| Catalyst e | Parts | 0.2 | 0.2 | 0.2 |
| Polyisocyanate compound c | Isocyanate index | | 105 | |
| Polyisocyanate compound a | Isocyanate index | 105 | | 100 |
| Size of foams (length × width) | mm | 300 × 300 | 300 × 300 | 300 × 300 |

TABLE 3-continued

| | | | | |
|---|---|---|---|---|
| Total amount of Zn/Co in polyol mixture | ppm | 4.49 | 4.49 | 3.54 |
| Form shrinkage | | ○ | ○ | ○ |
| Core density | kg/m³ | 80.2 | 78.5 | 77.5 |
| 25% ILD | N/314 cm² | 91 | 72 | 86 |
| Air flow | L/min | 83 | 92 | 70 |
| Tensile strength | kPa | 93 | 53 | 60 |
| Elongation | % | 218 | 260 | 201 |
| Dry set | % | 2.8 | 3.4 | 4.2 |
| Wet set | % | 1.2 | 0.5 | 2.3 |
| Rebound resilience of core | % | 15 | 22 | 15 |
| Change in hardness (−5° C./23° C.) | % | 8.1 | 4.5 | 6.7 |
| FMVSS-302 | | Passed (N.B.) | Passed (N.B.) | Passed (N.B.) |
| UL 94 Combustion distance | mm | 13 | 0 | 0 |
| Combustion time | sec | 25 | 0 | 0 |
| Combustion rate | mm/min | 31 | 0 | 0 |
| judgment | | HBF Passed | HBF Passed | HBF Passed |

TABLE 4

| | | Ex. 18 | Ex. 19 | Ex. 20 |
|---|---|---|---|---|
| Polyol A4 | Parts | 25 | 25 | 25 |
| Polyol B1 | Parts | 35 | 35 | 35 |
| Polyol B2 | Parts | 40 | 40 | 40 |
| Monool D1 | Parts | 10 | 20 | 5 |
| Blowing agent | Parts | 1.05 | 1.14 | 1 |
| Catalyst a | Parts | 0.3 | 0.3 | 0.3 |
| Catalyst b | Parts | | | |
| Catalyst c | Parts | | | |
| Foam stabilizer a | Parts | 0.3 | 0.3 | 0.3 |
| Foam stabilizer b | Parts | | | |
| Catalyst e | Parts | 0.2 | 0.2 | 0.2 |
| Polyisocyanate compound c | Isocyanate index | | | |
| Polyisocyanate compound a | Isocyanate index | 100 | 100 | 105 |
| Size of foams (length × width) | mm | 300 × 300 | 300 × 300 | 300 × 300 |
| Total amount of Zn/Co in polyol mixture | ppm | 4.03 | 4.88 | 3.54 |
| Form shrinkage | | ○ | ○ | ○ |
| Core density | kg/m³ | 78.2 | 81.1 | 78.9 |
| 25% ILD | N/314 cm² | 74 | 80 | 89 |
| Air flow | L/min | 78 | 88 | 72 |
| Tensile strength | kPa | 54 | 53 | 61 |
| Elongation | % | 210 | 221 | 190 |
| Dry set | % | 3.2 | 2.1 | 3.9 |
| Wet set | % | 1.5 | 1.1 | 2.1 |
| Rebound resilience of core | % | 10 | 8 | 16 |
| Change in hardness (−5° C./23° C.) | % | 5.5 | 4.9 | 6.5 |
| FMVSS-302 | | Passed (N.B.) | Passed (N.B.) | Passed (N.B.) |
| UL 94 Combustion distance | mm | 0 | 0 | 0 |
| Combustion time | sec | 0 | 0 | 0 |
| Combustion rate | mm/min | 0 | 0 | 0 |
| judgment | | HBF Passed | HBF Passed | HBF Passed |

| | | Ex. 21 | Ex. 22 | Ex. 23 |
|---|---|---|---|---|
| Polyol A4 | Parts | 25 | 25 | 25 |
| Polyol B1 | Parts | 35 | 35 | 35 |
| Polyol B2 | Parts | 40 | 40 | 40 |
| Monool D1 | Parts | 10 | 20 | 5 |
| Blowing agent | Parts | 1.05 | 1.14 | 1 |
| Catalyst a | Parts | 0.3 | 0.3 | 0.3 |
| Catalyst b | Parts | | | |
| Catalyst c | Parts | | | |
| Foam stabilizer a | Parts | 0.3 | 0.3 | 0.3 |
| Foam stabilizer b | Parts | | | |
| Catalyst e | Parts | 0.2 | 0.2 | 0.2 |
| Polyisocyanate compound c | Isocyanate index | | | |
| Polyisocyanate compound a | Isocyanate index | 105 | 105 | 110 |
| Size of foams (length × width) | mm | 300 × 300 | 300 × 300 | 300 × 300 |
| Total amount of Zn/Co in polyol mixture | ppm | 4.03 | 4.88 | 3.54 |
| Form shrinkage | | ○ | ○ | ○ |
| Core density | kg/m³ | 80.1 | 80.9 | 79.3 |
| 25% ILD | N/314 cm² | 78 | 83 | 90 |
| Air flow | L/min | 78 | 90 | 73 |
| Tensile strength | kPa | 56 | 56 | 69 |
| Elongation | % | 199 | 188 | 182 |
| Dry set | % | 3.1 | 1.9 | 3.2 |
| Wet set | % | 1.4 | 1.1 | 2 |
| Rebound resilience of core | % | 11 | 10 | 17 |
| Change in hardness (−5° C./23° C.) | % | 5.3 | 4.5 | 6.3 |
| FMVSS-302 | | Passed (N.B.) | Passed (N.B.) | Passed (N.B.) |
| UL 94 Combustion distance | mm | 0 | 0 | 0 |
| Combustion time | sec | 0 | 0 | 0 |
| Combustion rate | mm/min | 0 | 0 | 0 |
| judgment | | HBF Passed | HBF Passed | HBF Passed |

TABLE 5

| | | Ex. 24 | Ex. 25 | Ex. 26 | Ex. 29 |
|---|---|---|---|---|---|
| Polyol A4 | Parts | 25 | 25 | 25 | 25 |
| Polyol B1 | Parts | 35 | 35 | 35 | 35 |
| Polyol B2 | Parts | 40 | 40 | 40 | 40 |
| Monool D1 | Parts | 10 | 20 | 5 | 5 |
| Blowing agent | Parts | 1.05 | 1.14 | 1.4 | 1.4 |
| Catalyst a | Parts | 0.3 | 0.3 | 0.3 | 0.3 |
| Catalyst b | Parts | | | | |
| Catalyst c | Parts | | | | |
| Foam stabilizer a | Parts | 0.3 | 0.3 | 0.3 | 0.3 |
| Foam stabilizer b | Parts | | | | |
| Catalyst e | Parts | 0.2 | 0.2 | 0.2 | 0.2 |
| Polyisocyanate compound c | Isocyanate index | | | | |
| Polyisocyanate compound a | Isocyanate index | 110 | 110 | 90 | 80 |
| Size of foams (length × width) | mm | 300 × 300 | 300 × 300 | 300 × 300 | 300 × 300 |
| Total amount of Zn/Co in polyol mixture | ppm | 4.03 | 4.88 | 3.54 | 3.54 |
| Form shrinkage | | ○ | ○ | ○ | Collapsed |
| Core density | kg/m³ | 82.1 | 83.1 | 60.2 | |
| 25% ILD | N/314 cm² | 85 | 85 | 44 | |
| Air flow | L/min | 81 | 91 | 31 | |
| Tensile strength | kPa | 59 | 55 | 43 | |
| Elongation | % | 184 | 150 | 200 | |
| Dry set | % | 2.9 | 1.3 | 5.6 | |
| Wet set | % | 1.2 | 1.2 | 4.9 | |
| Rebound resilience of core | % | 12 | 9 | 5 | |

TABLE 5-continued

|  |  | Ex. 24 | Ex. 25 | Ex. 26 | Ex. 29 |
|---|---|---|---|---|---|
| Change in hardness (−5° C./23° C.) | % | 5.1 | 4.1 | 6.9 |  |
| FMVSS-302 |  | Passed (N.B.) | Passed (N.B.) | Passed (N.B.) |  |
| UL 94 Combustion distance | mm | 0 | 0 | 0 |  |
| Combustion time | sec | 0 | 0 | 0 |  |
| Combustion rate | mm/min | 0 | 0 | 0 |  |
| judgment |  | HBF Passed | HBF Passed | HBF Passed |  |

TABLE 6

|  |  | Ex. 30 | Ex. 31 | Ex. 32 |
|---|---|---|---|---|
| Polyol A1 | Parts | 20 | 20 | 20 |
| Polyol B1 | Parts | 40 | 40 | 40 |
| Polyol B2 | Parts | 40 | 40 | 40 |
| Monool D1 | Parts | 5 | 5 | 5 |
| Blowing agent | Parts | 1.2 | 1.2 | 1.2 |
| Catalyst a | Parts | 0.6 | 0.6 | 0.6 |
| Foam stabilizer a | Parts | 0.3 | 0.3 | 0.3 |
| Catalyst d | Parts | 0.4 | 0.4 | 0.4 |
| Polyisocyanate compound a | Isocyanate index | 102 |  |  |
| Polyisocyanate compound b | Isocyanate index |  | 102 |  |
| Polyisocyanate compound d | Isocyanate index |  |  | 102 |
| Total amount of Zn/Co in polyol mixture | ppm | 2.68 | 2.68 | 2.68 |
| Curing time | min | 20 | 20 | 10 |
| Crushing property |  | ○ | ○ | ○ |
| Curability |  | ○ | ○ | ○ |
| Form shrinkage |  | ○ | ○ | ○ |
| Total density | kg/m$^3$ | 71.2 | 71.1 | 70.9 |
| Core density | kg/m$^3$ | 66.9 | 70.3 | 62.9 |
| 25% ILD | N/314 cm$^2$ | 55 | 56 | 65 |
| Air flow | L/min | 39 | 11 | 16 |
| Rebound resilience of core | % | 10 | 10 | 7 |
| Tensile strength | kPa | 60 | 54 | 49 |
| Elongation | % | 253 | 224 | 224 |
| Dry set | % | 2.6 | 6.1 | 0.3 |
| Wet set | % | 1.8 | 2.7 | 0.1 |
| Hysteresis loss | % | 39.4 | 34.9 | 47.2 |
| FMVSS-302 |  | Passed (N.B.) | Passed (N.B.) | Passed (N.B.) |
| UL 94 Combustion distance | mm | 0 | 0 | 0 |
| Combustion time | sec | 0 | 0 | 0 |
| Combustion rate | mm/min | 0 | 0 | 0 |
| judgment |  | HBF Passed | HBF Passed | HBF Passed |

TABLE 7

|  |  | Ex. 33 | Ex. 34 | Ex. 35 | Ex. 36 |
|---|---|---|---|---|---|
| Polyol A4 | Parts | 23.5 | 23.5 | 23.5 | 23.5 |
| Polyol B1 | Parts | 33.0 | 33.0 | 33.0 | 33.0 |
| Polyol B2 | Parts | 41.0 | 41.0 | 41.0 | 41.0 |
| Polyol B4 | Parts | 5 | 6 |  |  |
| Polyol B5 | Parts |  |  |  |  |
| Polyol B6 | Parts |  |  |  |  |
| Monool D1 | Parts | 7.5 | 7.5 | 7.5 | 7.5 |
| Polyol E1 | Parts |  |  | 3 | 4 |
| Flame retardant a | Parts |  |  |  |  |
| Blowing agent | Parts | 1.44 | 1.44 | 1.44 | 1.44 |
| Catalyst a | Parts |  |  |  |  |
| Catalyst b | Parts | 0.25 | 0.25 | 0.25 | 0.25 |
| Foam stabilizer a | Parts |  |  |  |  |
| Foam stabilizer c | Parts | 0.35 | 0.35 | 0.35 | 0.35 |
| Foam stabilizer d | Parts | 0.35 | 0.35 | 0.35 | 0.35 |
| Form stabilizer e | Parts |  |  |  |  |
| Catalyst d | Parts |  |  |  |  |
| Catalyst e | Parts | 0.04 | 0.04 | 0.04 | 0.04 |
| Polyisocyanate compound a | Isocyanate index | 100 | 100 | 100 | 100 |
| Size of foams (length × width) | mm | 300 × 300 | 300 × 300 | 300 × 300 | 300 × 300 |
| Total amount of Zn/Co in polyol mixture | ppm | 3.5 | 3.5 | 3.6 | 3.6 |
| Form shrinkage |  | ○ | ○ | ○ | ○ |
| Core density | kg/m$^3$ | 59.6 | 59.5 | 58.0 | 57.5 |
| 25% ILD | N/314 cm$^2$ | 80 | 70 | 68 | 69 |
| Air flow | L/min | 22 | 33 | 29 | 28 |
| Tensile strength | kPa | 82 | 85 | 77 | 83 |
| Elongation | % | 245 | 258 | 244 | 256 |
| Dry set | % | 1.7 | 2.2 | 0.5 | 2.1 |
| Wet set | % | 1.9 | 1.1 | 1.7 | 1.5 |
| Rebound resilience of core | % | 11 | 14 | 13 | 13 |
| Change in hardness (−5° C./23° C.) | % | 11.5 | 10.2 | 12.0 | 12.5 |
| FMVSS-302 |  | Passed (N.B.) | Passed (N.B.) | Passed (N.B.) | Passed (N.B.) |
| UL 94 Combustion distance | mm | 0 | 0 | 0 | 0 |
| Combustion time | sec | 0 | 0 | 0 | 0 |
| Combustion rate | mm/min | 0 | 0 | 0 | 0 |
| judgment |  | HBF Passed | HBF Passed | HBF Passed | HBF Passed |

|  |  | Ex. 37 | Ex. 38 | Ex. 39 |
|---|---|---|---|---|
| Polyol A4 | Parts | 23.8 |  | 25 |
| Polyol B1 | Parts | 33.3 |  |  |
| Polyol B2 | Parts | 38.1 |  | 40 |
| Polyol B4 | Parts |  |  |  |
| Polyol B5 | Parts |  | 100 |  |
| Polyol B6 | Parts |  |  | 35 |
| Monool D1 | Parts | 4.8 |  |  |
| Polyol E1 | Parts |  |  |  |
| Flame retardant a | Parts |  | 10 |  |
| Blowing agent | Parts | 1.2 | 1.2 | 1.6 |
| Catalyst a | Parts |  |  | 0.3 |
| Catalyst b | Parts | 0.25 | 0.2 |  |
| Foam stabilizer a | Parts | 0.3 |  |  |
| Foam stabilizer c | Parts |  |  |  |
| Form stabilizer d | Parts |  |  |  |
| Form stabilizer e | Parts |  | 0.8 |  |
| Catalyst d | Parts | 0.15 | 0.15 | 0.2 |
| Catalyst e | Parts |  |  |  |
| Polyisocyanate compound a | Isocyanate index | 102 | 102 | 102 |
| Size of foams (length × width) | mm | 300 × 300 | 300 × 300 | 600 × 600 |
| Total amount of Zn/Co in polyol mixture | ppm | 3.54 | 0 | 3.54 |
| Form shrinkage |  | ○ | ○ | ○ |
| Core density | kg/m$^3$ | 66.1 | 72.3 | 50.1 |
| 25% ILD | N/314 cm$^2$ | 62 | 118 | 74 |
| Air flow | L/min | 25 | 7 | 25 |
| Tensile strength | kPa | 87 | 47 | 74 |
| Elongation | % | 239 | 99 | 153 |
| Dry set | % | 1.4 | 1.0 | 3.4 |
| Wet set | % | 0.9 | 1.0 | 3.0 |
| Rebound resilience of core | % | 7 | 13 | 11 |
| Change in hardness (−5° C./23° C.) | % | 8.5 | 25.2 | 10.1 |
| FMVSS-302 |  | Passed (N.B.) | Passed (N.B.) | Passed (N.B.) |

TABLE 7-continued

| | | | | |
|---|---|---|---|---|
| UL 94 Combustion distance | mm | 0 | 0 | 25 |
| Combustion time | sec | 0 | 0 | 40 |
| Combustion rate | mm/min | 0 | 0 | 37.5 |
| judgment | | HBF Passed | HBF Passed | HBF Passed |

TABLE 8

| | | Ex. 12 | Ex. 37 | Ex. 38 |
|---|---|---|---|---|
| Change in mass | | | | |
| After 130 hours | % | 0.9 | 0.8 | 2.8 |
| After 260 hours | % | 1.8 | 1.9 | 3.8 |
| After 520 hours | % | 4.0 | 4.8 | 9.5 |
| UL94 Combustion distance | | | | |
| After 130 hours | mm | 0 | 0 | 7.5 |
| After 260 hours | mm | 0 | 0 | 16.5 |
| After 520 hours | mm | 0 | 0 | 18.0 |

The flexible polyurethane foams of Examples 1 to 8, 12 to 28, 33 to 37 and 39, which used a polyol mixture containing from 0.1 to 200 ppm of Zn and Co, as shown in Table 7, had little shrinkage and good flame retardancy. On the other had, in Examples 9 to 11, the purified polyol (A) having little amount of remaining double metal cyanide complex catalyst or the polyol (a) which did not use a double metal cyanide complex, was used, whereby the foam shrank. Further, in Example 29, the isocyanate index was at most 90, whereby the foam was unstable and collapsed.

Further, with respect to the flexible polyurethane foam in Examples 30 to 32, as shown in Table 6, even in a mold method, the foam did not shrink, and flame retardancy was good.

Further, the flexible polyurethane foam in Example 39, was stable during foaming even without using a foam stabilizer.

The results of the weather resistance test are shown in Table 8. The flexible polyurethane foams in Example 12 and 37 of the present invention, had good results in change in mass after exposure to ultraviolet rays and flammability test, but with the flexible polyurethane foam in Example 38 which used a conventional flame retardant, the longer the exposure time to ultraviolet rays, the worse the weather resistance and flame retardancy.

INDUSTRIAL APPLICABILITY

The flexible polyurethane foam obtained by the production process of the present invention, is suitably used as an impact absorber, a sound absorber or a vibration absorber. Further, it is suitably used for beddings, mattresses, cushions, particularly interior decorating materials for cars such as seat cushions, seat back, headrests, armrests, sun visors or ceilings, computers or sealing materials. It is particularly suitably used for beddings (such as mattresses or pillows).

The entire disclosure of Japanese Patent Application No. 2006-052011 filed on Feb. 28, 2006 including specification, claims and summary is incorporated herein by reference in its entirety.

What is claimed is:

1. A process for producing a flexible polyurethane foam, which comprises reacting a polyol mixture with a polyisocyanate compound in the presence of a urethane-forming catalyst, a blowing agent and a foam stabilizer, wherein the polyol mixture comprises a polyol (A) and a polyol (B), and the proportion of the polyisocyanate compound to the polyol mixture is at least 90 by isocyanate index, and the total amount of Zn and Co in the polyol mixture is from 0.1 to 200 ppm, wherein:
   polyol (A) is a polyether polyol having an average of from 2 to 3 hydroxyl groups and a hydroxyl value of from 10 to 90 mgKOH/g, obtained by ring-opening addition polymerization of only propylene oxide to an initiator with a double metal cyanide complex catalyst; and
   polyol (B) is a polyoxypropylene polyol having an average of from 2 to 3 hydroxyl groups and a hydroxyl value of from 15 to 250 mgKOH/g, which is obtained by ring-opening addition polymerization of only propylene oxide (PO) to an initiator with an alkali metal compound catalyst, and is a polyether polyol other than the polyether polyol obtained by ring-opening addition polymerization of only propylene oxide to an initiator with a double metal cyanide complex catalyst.

2. The process for producing a flexible polyurethane foam according to claim 1, wherein the polyol (A) is from 5 to 50 mass %, based on the total (100 mass %) of the polyol (A) and the polyol (B).

3. The process for producing a flexible polyurethane foam according to claim 1, wherein the total amount of Zn and Co in the polyol (A) is from 0.1 to 200 ppm.

4. The process for producing a flexible polyurethane foam according to claim 1, wherein the polyol mixture further comprises at most 30 parts by mass of a monool (D), per 100 parts by mass in total of the polyol (A) and the polyol (B), wherein:
   monool (D) is a polyether monool having a hydroxyl value of from 5 to 200 mgKOH/g.

5. The process for producing a flexible polyurethane foam according to claim 4, wherein the monool (D) is a polyoxypropylene monool obtained by ring-opening addition polymerization of only propylene oxide to an initiator.

6. The process for producing a flexible polyurethane foam according to claim 1, wherein the polyol mixture further comprises at most 10 parts by mass of polyol (C), per 100 parts by mass in total of the polyol (A) and the polyol (B):
   polyol (C) has an average of from 2 to 6 hydroxyl groups and a hydroxyl value of from 251 to 1,830 mgKOH/g.

7. A flexible polyurethane foam produced by reacting a polyol mixture with a polyisocyanate compound in the presence of an urethane-forming catalyst, a blowing agent and a foam stabilizer, wherein the polyol mixture comprises a polyol (A) and a polyol (B), the proportion of the polyisocyanate compound to the polyol mixture is at least 90 by isocyanate index, and the total amount of Zn and Co in the polyol mixture is from 0.1 to 200 ppm, wherein:
   polyol (A) is a polyether polyol having an average of from 2 to 3 hydroxyl groups and a hydroxyl value of from 10 to 90 mgKOH/g, obtained by ring-opening addition polymerization of only propylene oxide to an initiator with a double metal cyanide complex catalyst; and
   polyol (B) is a polyoxypropylene polyol having an average of from 2 to 3 hydroxyl groups and a hydroxyl value of from 15 to 250 mgKOH/g, which is obtained by ring-opening addition polymerization of only propylene oxide (PO) to an initiator with an alkali metal compound catalyst, and is a polyether polyol other than the polyether polyol obtained by ring-opening addition polymerization of only propylene oxide to an initiator with a double metal cyanide complex catalyst.

8. The flexible polyurethane foam according to claim 7, wherein the polyol mixture further comprises at most 30 parts by mass of a monool (D), per 100 parts by mass in total of the polyol (A) and the polyol (B), wherein:

monool (D) is a polyether monool having a hydroxyl value of from 5 to 200 mgKOH/g.

9. The flexible polyurethane foam according to claim 7, wherein the polyol mixture further comprises at most 10 parts by mass of a polyol (C), per 100 parts by mass in total of the polyol (A) and the polyol (B), wherein:

polyol (C) is a polyol having an average of from 2 to 6 hydroxyl groups and a hydroxyl value of from 251 to 1,830 mgKOH/g.

10. The process according to claim 1, wherein the total amount of Zn and Co in the polyol mixture is from 0.1 to 50 ppm.

11. The process according to claim 1, wherein the total amount of Zn and Co in the polyol mixture is from 2.1 to 10 ppm.

12. The flexible polyurethane foam according to claim 7, wherein the total amount of Zn and Co in the polyol mixture is from 0.1 to 50 ppm.

13. The flexible polyurethane foam according to claim 7, wherein the total amount of Zn and Co in the polyol mixture is from 2.1 to 10 ppm.

14. The process according to claim 1, wherein the total amount of Zn and Co in the polyol mixture is from 0.5 to 100 ppm.

15. The process according to claim 1, wherein the total amount of Zn and Co in the polyol mixture is from 1 to 50 ppm.

16. The process according to claim 1, wherein the total amount of Zn and Co in the polyol (A) is from 0.5 to 100 ppm.

17. The process according to claim 1, wherein the total amount of Zn and Co in the polyol (A) is from 1 to 50 ppm.

18. The flexible polyurethane foam according to claim 7, wherein the total amount of Zn and Co in the polyol mixture is from 0.5 to 100 ppm.

19. The flexible polyurethane foam according to claim 7, wherein the total amount of Zn and Co in the polyol mixture is from 1 to 50 ppm.

20. The flexible polyurethane foam according to claim 7, wherein the total amount of Zn and Co in the polyol (A) is from 0.5 to 100 ppm.

21. The flexible polyurethane foam according to claim 7, wherein the total amount of Zn and Co in the polyol (A) is from 1 to 50 ppm.

\* \* \* \* \*